United States Patent
Sugiura et al.

(10) Patent No.: US 10,786,789 B2
(45) Date of Patent: Sep. 29, 2020

(54) EJECTOR, FUEL CELL SYSTEM EQUIPPED WITH EJECTOR AND REFRIGERATION CYCLE SYSTEM EQUIPPED WITH EJECTOR

(71) Applicant: DENSO CORPORATION, Kariya, Aichi-pref. (JP)

(72) Inventors: Takayuki Sugiura, Kariya (JP); Jun Osaka, Kariya (JP); Naoki Watanabe, Kariya (JP)

(73) Assignee: DENSO CORPORATION, Kariya (JP)

( * ) Notice: Subject to any disclaimer, the term of this patent is extended or adjusted under 35 U.S.C. 154(b) by 287 days.

(21) Appl. No.: 15/928,653

(22) Filed: Mar. 22, 2018

(65) Prior Publication Data

US 2018/0290114 A1  Oct. 11, 2018

(30) Foreign Application Priority Data

Apr. 5, 2017  (JP) .................................. 2017-075531

(51) Int. Cl.

| | | |
|---|---|---|
| *B01F 5/04* | (2006.01) | |
| *H01M 8/04082* | (2016.01) | |
| *B01F 3/02* | (2006.01) | |
| *B01F 3/04* | (2006.01) | |
| *F25B 41/00* | (2006.01) | |

(Continued)

(52) U.S. Cl.
CPC ................ *B01F 5/043* (2013.01); *B01F 3/02* (2013.01); *B01F 3/04503* (2013.01); *B01F 5/0653* (2013.01); *F25B 41/00* (2013.01); *H01M 8/04201* (2013.01); *B01F 2005/0438* (2013.01);

(Continued)

(58) Field of Classification Search
CPC combination set(s) only.
See application file for complete search history.

(56) References Cited

U.S. PATENT DOCUMENTS

| | | | | |
|---|---|---|---|---|
| 4,382,044 A | * | 5/1983 | Baumgartner | ........ B01F 5/0471 210/192 |
| 5,205,648 A | * | 4/1993 | Fissenko | ............... B01F 3/0807 137/3 |

(Continued)

FOREIGN PATENT DOCUMENTS

JP          2006-183586 A       7/2006

OTHER PUBLICATIONS

Matsuo. "Compressible fluid dynamics Flow of fluids and analysis." Science and Engineering, Inc., Nov. 10, 1994, pp. 82-83.

*Primary Examiner* — Kaity V Chandler
(74) *Attorney, Agent, or Firm* — Oliff PLC (57) ABSTRACT

An ejector has an interior nozzle, an exterior nozzle, a suction part, a mixing part and a diffuser part. The interior nozzle and the exterior nozzle are arranged coaxially with each other. A driving fluid is supplied to the interior nozzle and/or the exterior nozzle. The suction part is arranged on an outer periphery of the exterior nozzle and sucks a suction fluid by a driving fluid jet ejected from the interior nozzle and/or the exterior nozzle. A mixing part mixes the driving fluid jet with the suction fluid, and supplies a mixture fluid. The diffuser part reduces a flow speed of the mixture fluid and ejects the mixture fluid outside. An outlet part of the interior nozzle is arranged at an upstream side of the ejector more than an outlet part of the exterior nozzle along the axial direction of the ejector.

12 Claims, 8 Drawing Sheets

(51) Int. Cl.
- *B01J 7/00* (2006.01)
- *B01J 7/02* (2006.01)
- *B01F 5/06* (2006.01)

(52) U.S. Cl.
CPC ............ *B01F 2215/0098* (2013.01); *B01F 2215/0431* (2013.01); *F25B 2341/0012* (2013.01)

(56) References Cited

U.S. PATENT DOCUMENTS

| | | | | |
|---|---|---|---|---|
| 6,550,265 | B2* | 4/2003 | Takeuchi | F25B 9/008 62/116 |
| 6,606,873 | B2* | 8/2003 | Takeuchi | B60H 1/3204 62/191 |
| 6,677,408 | B1* | 1/2004 | Mahling | B01F 5/0473 422/132 |
| 6,782,713 | B2* | 8/2004 | Takeuchi | B60H 1/3204 62/191 |
| 6,799,435 | B2* | 10/2004 | Saito | F04F 5/04 417/77 |
| 6,966,199 | B2* | 11/2005 | Takeuchi | F04F 5/461 62/500 |
| 7,207,190 | B2* | 4/2007 | Sugiura | B41J 2/17596 62/500 |
| 7,299,645 | B2* | 11/2007 | Oshitani | F25B 41/00 62/191 |
| 7,520,142 | B2* | 4/2009 | Saito | B60H 1/3211 62/500 |
| 7,779,647 | B2* | 8/2010 | Takeuchi | F25B 40/00 417/151 |
| 8,973,394 | B2* | 3/2015 | Yamada | F25B 41/00 62/500 |
| 9,372,014 | B2* | 6/2016 | Nagano | F25B 41/00 |
| 9,771,954 | B2* | 9/2017 | Awa | F04F 5/46 |
| 2001/0025499 | A1* | 10/2001 | Takeuchi | F25B 41/00 62/175 |
| 2002/0000095 | A1* | 1/2002 | Takeuchi | F04F 5/04 62/500 |
| 2002/0184903 | A1 | 12/2002 | Takeuchi et al. | |
| 2003/0213264 | A1* | 11/2003 | Ogata | F04F 5/461 62/500 |
| 2004/0103685 | A1* | 6/2004 | Yamaguchi | B60H 1/00899 62/500 |
| 2004/0172966 | A1* | 9/2004 | Ozaki | F04F 5/04 62/500 |
| 2004/0255613 | A1* | 12/2004 | Choi | F25B 49/027 62/500 |
| 2005/0011221 | A1* | 1/2005 | Hirota | F04B 27/1804 62/500 |
| 2005/0178150 | A1* | 8/2005 | Oshitani | F25B 41/00 62/500 |
| 2006/0254308 | A1* | 11/2006 | Yokoyama | F25B 39/02 62/500 |
| 2007/0028630 | A1* | 2/2007 | Yamada | F25B 41/00 62/170 |
| 2007/0163293 | A1* | 7/2007 | Ikegami | F25B 41/00 62/500 |
| 2007/0180852 | A1* | 8/2007 | Sugiura | F25B 41/00 62/500 |
| 2007/0258315 | A1* | 11/2007 | Matula | B05B 7/0408 366/134 |
| 2008/0000263 | A1* | 1/2008 | Oomura | F25B 39/028 62/525 |
| 2009/0186153 | A1* | 7/2009 | Hertz | B01J 19/26 427/216 |
| 2011/0120182 | A1* | 5/2011 | Haussmann | F25B 39/022 62/524 |
| 2011/0296759 | A1* | 12/2011 | Roychoudhury | C01B 3/38 48/89 |
| 2015/0049575 | A1* | 2/2015 | Matula | B01F 5/0463 366/173.1 |
| 2015/0218996 | A1* | 8/2015 | Brandl | F01N 3/2066 60/295 |
| 2016/0262990 | A1* | 9/2016 | Goutayer | A61K 8/37 |
| 2016/0277461 | A1* | 9/2016 | Sun | G06F 3/0481 |
| 2016/0354754 | A1* | 12/2016 | Hirson | B01J 19/088 |
| 2017/0102010 | A1* | 4/2017 | Cheong | F25B 1/06 |

* cited by examiner

FIG.1

EJECTOR 1

UPSTREAM SIDE ←----------→ DOWNSTREAM SIDE

FIG.4

UPSTREAM SIDE ←----------→ DOWNSTREAM SIDE

FIG.7  COMPARATIVE EXAMPLE

FIG.8  COMPARATIVE EXAMPLE

FIG.9

COMPARATIVE EXAMPLE

EJECTOR, FUEL CELL SYSTEM EQUIPPED WITH EJECTOR AND REFRIGERATION CYCLE SYSTEM EQUIPPED WITH EJECTOR

CROSS-REFERENCE TO RELATED APPLICATION

This application is related to and claims priority from Japanese Patent Application No. 2017-75531 filed on Apr. 5, 2017, the contents of which are hereby incorporated by reference.

BACKGROUND OF THE INVENTION

1. Field of the Invention

The present invention relates to ejectors, fuel cell systems equipped with an ejector, and refrigeration cycle systems equipped with an ejector.

2. Description of the Related Art

There have been provided a fuel cell system and a refrigeration cycle system, each of which uses an ejector having a conventional structure using a nozzle and a diffuser. This ejector is configured to suck a suction fluid by using a driving fluid jet supplied from the nozzle. The diffuser in the ejector ejects a mixture fluid of the suction fluid and the driving fluid jet simultaneously. For example, patent document 1, Japanese patent laid open publication No. 2006-183586 shows an ejector having such a conventional structure previously described in which a first nozzle and a second nozzle are arranged coaxially.

However, an outlet part of the second nozzle, arranged at the inward side of the ejector, projects forward to a downstream side more than an outlet part of the first nozzle, arranged at the outward side of the ejector having the conventional structure disclosed in patent document 1. This structure allows the fluid jet supplied from the first nozzle to easily diffuse toward an outer peripheral side of the ejector. This conventional structure reduces suction efficiency, i.e. a suction force, generated by the driving fluid jet, to suck the suction fluid, and as a result prevents energy efficiency of the ejector from increasing.

SUMMARY

It is therefore desired to provide an ejector having an interior nozzle and an exterior nozzle with superior energy efficiency when the exterior nozzle supplies a driving fluid jet, and to provide a fuel cell system equipped with the ejector and a refrigeration cycle system equipped with the ejector.

In accordance with one aspect of the present invention, there is provided an ejector having an interior nozzle, an exterior nozzle, a suction part, a mixing part and a diffuser part. The interior nozzle receives a driving fluid and ejects a driving fluid jet. The exterior nozzle is arranged coaxially with the interior nozzle. The exterior nozzle also receives the driving fluid, and ejects the driving fluid jet. The suction part is arranged on an outer periphery of the exterior nozzle. The suction part sucks a suction fluid by using a force of the driving fluid jet ejected from the interior nozzle and/or the exterior nozzle. The mixing part mixes the driving fluid jet ejected from the interior nozzle and/or the exterior nozzle with the suction fluid sucked by the suction part. The mixing part supplies a mixture fluid. The diffuser part reduces a flow speed of the mixture fluid composed of the driving fluid jet and the suction fluid, and ejects the mixture fluid. In particular, an outlet part of the interior nozzle is arranged at an upstream side of the ejector more than an outlet part of the exterior nozzle along an axial direction of the ejector. In other words, the outlet part of the interior nozzle is arranged at the downstream side of the ejector less than the outlet part of the exterior nozzle along an axial direction of the ejector.

As previously described, the ejector as one aspect of the present invention has the improved structure previously described in which the outlet part of the interior nozzle is arranged at the upstream side of the flow of the driving fluid more than the outlet part of the exterior nozzle when viewed along the axial direction of the ejector.

This improved structure of the ejector makes it possible to avoid negative influence, caused by the flow of the driving fluid jet ejected from the interior nozzle affecting the correct flow of the driving fluid jet ejected from the outlet part of the exterior nozzle. That is, this improved structure prevents the driving fluid jet ejected from the outlet part of the exterior nozzle from being affected by the driving fluid jet ejected from the outlet part of the interior nozzle. Further, this structure of the ejector makes it possible to suppress the driving fluid jet ejected from the exterior nozzle from being diffused outside. It is accordingly possible to supply the overall driving fluid jet into the axial direction of the ejector and to increase the suction force of the driving fluid jet to suck the suction fluid flowing in the suction part. As a result, this improved structure makes it possible to increase the energy efficiency of the ejector when the driving fluid is ejected from the exterior nozzle.

In accordance with another aspect of the present invention, there is provided a fuel cell system. The fuel cell system has a fuel cell battery and a fuel gas supply passage. The fuel gas supply passage supplies a fuel gas to the fuel cell battery. In particular, an ejector is mounted on the fuel gas supply passage. The ejector has the improved structure previously described.

As previously described, the fuel cell system as another aspect of the present invention uses the ejector having the improved structure previously described. It is possible for the fuel cell system to have the improved energy efficiency when the fuel gas is supplied into the exterior nozzle in the ejector.

In accordance with another aspect of the present invention, there is provided a refrigeration cycle system. The refrigeration cycle system has a compressor unit, a radiator unit, an evaporation unit, an ejector and a gas-phase separator unit. The compressor unit receives a coolant, compresses the received coolant, increases a pressure of the coolant, and ejects the coolant at an increased pressure. The radiator unit cools the coolant ejected from the compressor unit. The evaporation unit evaporates the coolant to perform an endothermic process. The ejector receives the coolant supplied from the radiator unit as a driving fluid, and further receives the vapor-phase coolant as a suction fluid evaporated by the evaporation unit, and mixes the driving fluid and the suction fluid to generate a mixture fluid, and ejects the mixture fluid. In particular, the ejector has the improved structure previously described. The gas-phase separator unit receives the mixture fluid as the coolant ejected from the ejector, and separates the received coolant into a vapor-phase coolant and a liquid-phase coolant, supplies the vapor-phase coolant to the compressor unit, and supplies the liquid-phase coolant to the evaporation unit.

As previously described, the refrigeration cycle system as another aspect of the present invention uses the ejector having the improved structure previously described. It is possible for the refrigeration cycle system to have improved energy efficiency when the coolant is supplied into the exterior nozzle in the ejector.

BRIEF DESCRIPTION OF THE DRAWINGS

A preferred, non-limiting embodiment of the present invention will be described by way of example with reference to the accompanying drawings, in which.

DETAILED DESCRIPTION OF THE PREFERRED EMBODIMENTS

Hereinafter, various embodiments of the present invention will be described with reference to the accompanying drawings. In the following description of the various embodiments, like reference characters or numerals designate like or equivalent component parts throughout the several diagrams.

First Exemplary Embodiment

A description will be given of an ejector 1 according to the first exemplary embodiment with reference to FIG. 1 to FIG. 6.

Figure 1:
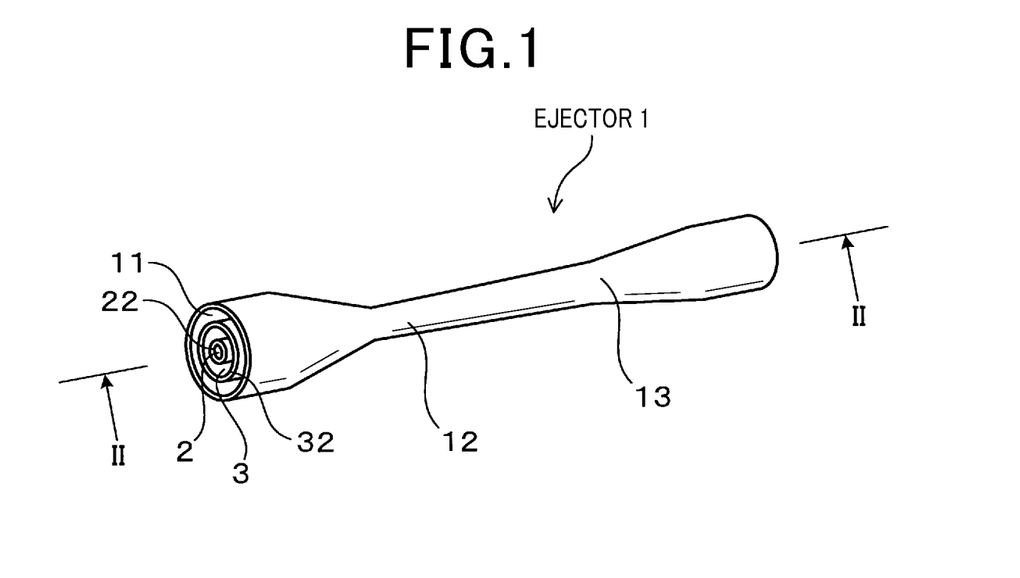
FIG. 1 is a perspective view showing a structure of an ejector 1 according to a first exemplary embodiment of the present invention.

FIG. 1 is a perspective view showing a structure of the ejector 1 according to the first exemplary embodiment. As shown in FIG. 1, the ejector 1 according to the first exemplary embodiment has an interior nozzle 2, an exterior nozzle 3, a suction part 11, a mixing part 12 and a diffuser part 13.

In the structure of the ejector 1 according to the first exemplary embodiment, the interior nozzle 2 and the exterior nozzle 3 are arranged coaxially, from which a driving fluid is ejected so as to generate a driving fluid jet. The suction part 11 is arranged at the outer peripheral part of the exterior nozzle 3. A suction fluid is sucked through the suction part 11 by using the driving fluid jet ejected from at least one of the interior nozzle 2 and the exterior nozzle 3. The mixing part 12 mixes the driving fluid jet and the suction fluid together to generate and supply a mixture fluid. The diffuser part 13 reduces a flow speed of the mixture fluid, and supplies the mixture fluid at a reduced flow speed.

Figure 2:
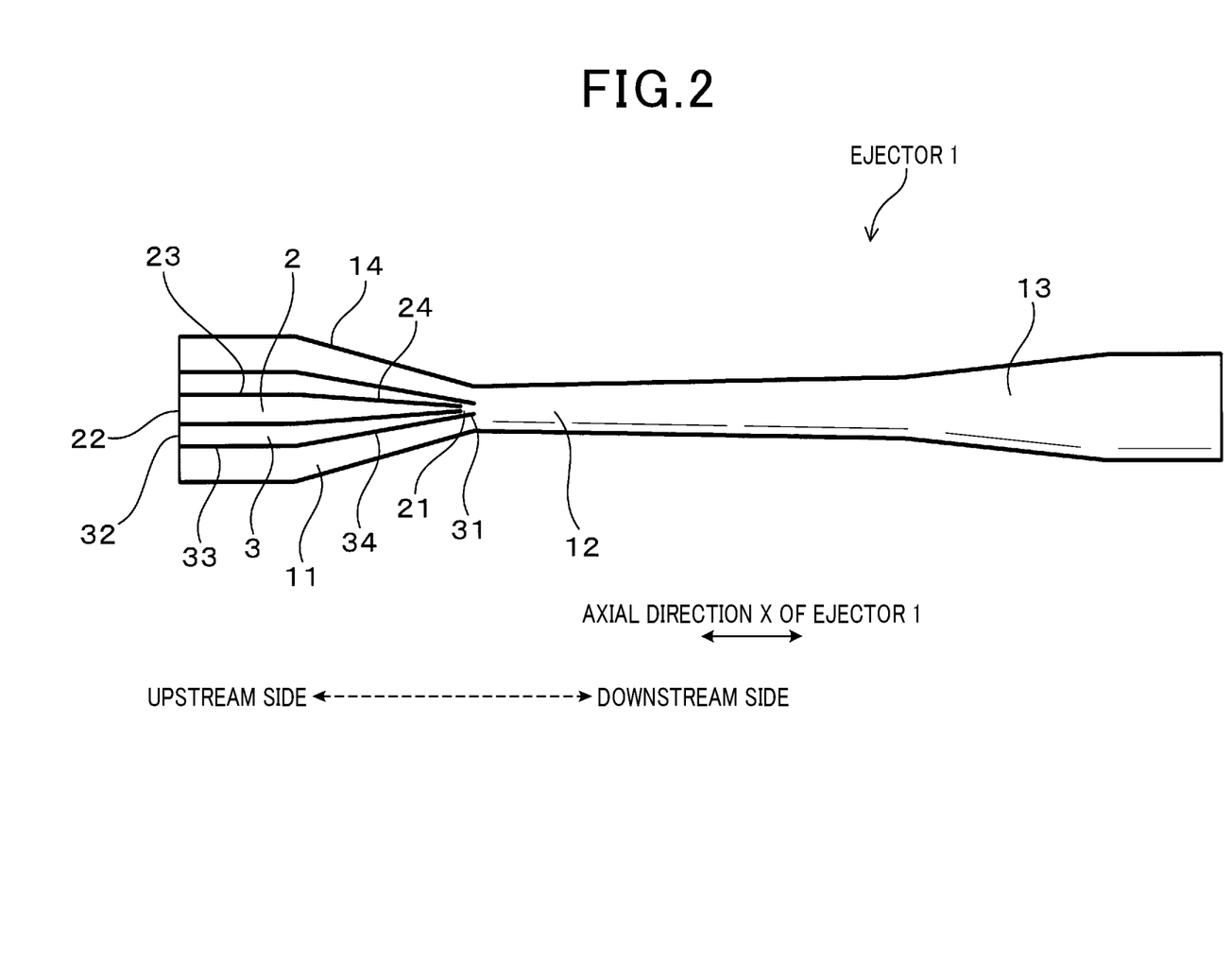
FIG. 2 is a view showing a cross section of the ejector 1 along the line II-II shown in FIG. 1.
Figure 3:
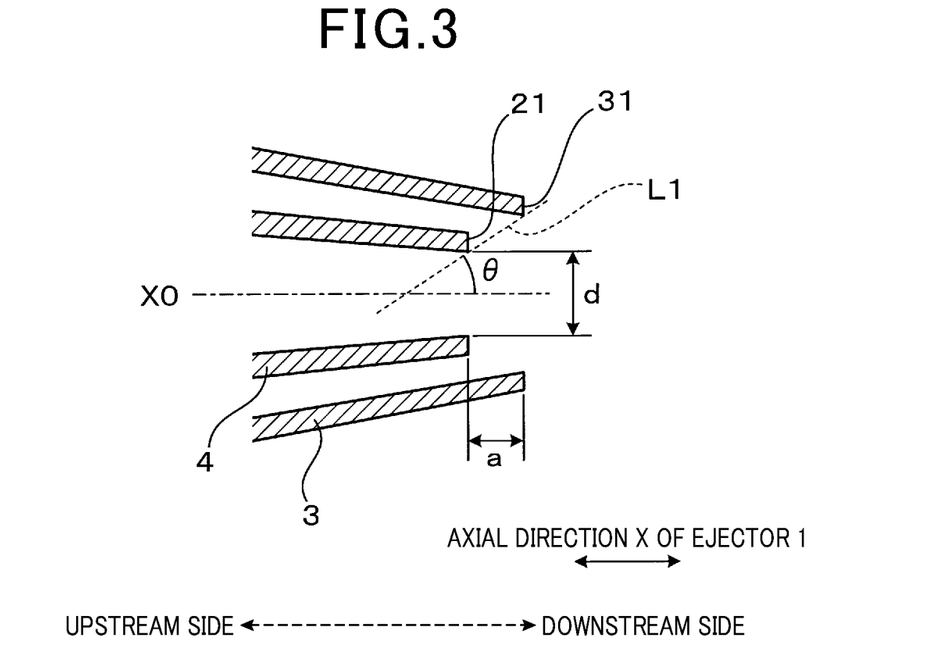
FIG. 3 is a view showing a cross section, along the axial direction of the ejector 1, of an outlet part 21 of an interior nozzle 2 and an outlet part 31 of an exterior nozzle 3 in the ejector 1 according to the first exemplary embodiment shown in FIG. 1.
Figure 4:
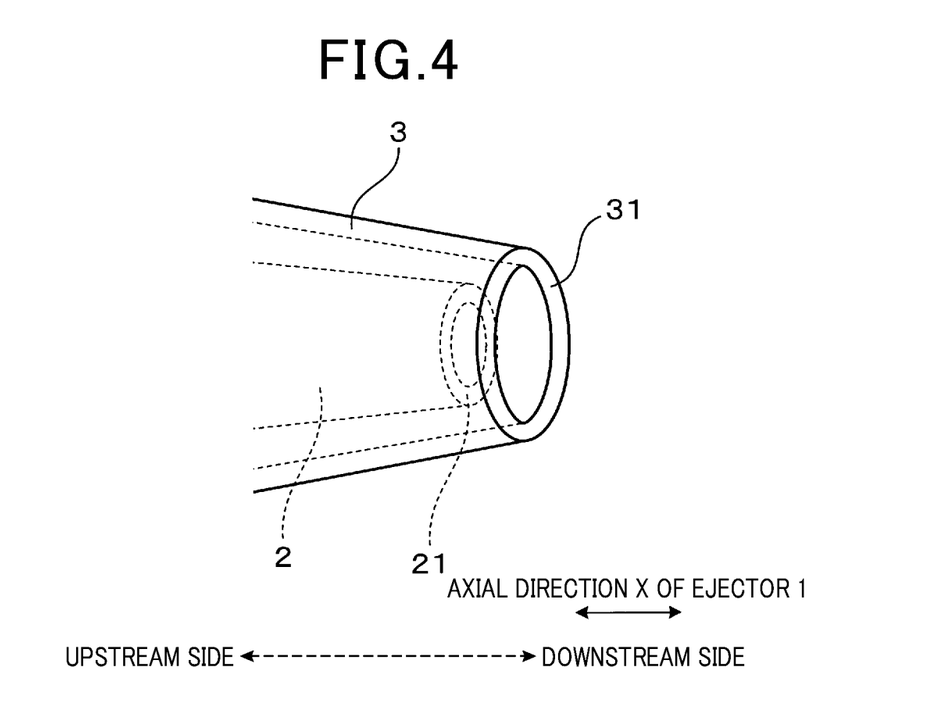
FIG. 4 is a perspective view showing the structure of the outlet part 21 of the interior nozzle 2 and the outlet part 31 of the exterior nozzle 3 in the ejector 1 according to the first exemplary embodiment shown in FIG. 1.

FIG. 2 is a view showing a cross section of the ejector 1 along the line II-II shown in FIG. 1. FIG. 3 is a view showing a cross section, along the axial direction of the ejector 1, of an outlet part 21 of the interior nozzle 2 and an outlet part 31 of an exterior nozzle 3 in the ejector 1 according to the first exemplary embodiment shown in FIG. 1. FIG. 4 is a perspective view showing the structure of the outlet part 21 of the interior nozzle 2 and the outlet part 31 of the exterior nozzle 3 in the ejector 1 according to the first exemplary embodiment shown in FIG. 1.

As shown in FIG. 2, FIG. 3 and FIG. 4, the outlet part 21 of the interior nozzle 2 is arranged at an upstream side more than the outlet part 31 of the exterior nozzle 3 along the axial direction X of the ejector 1. The axial direction X of the ejector 1 coincides with the axial direction of the interior nozzle 2 and the axial direction of the exterior nozzle 3.

A cross section, which is perpendicular to the axial direction X of the ejector 1, of each of the interior nozzle 2 and the exterior nozzle 3 has a circular shape. As shown in FIG. 3 and FIG. 4, the interior nozzle 2 and the exterior nozzle 3 are arranged coaxially along a central axis XO, which coincides with the axial direction X of the ejector 1.

As shown in FIG. 1 and FIG. 2, an inlet part 22 of the interior nozzle 2 and an inlet part 32 of the exterior nozzle 3 are arranged at an inlet-side end part of the ejector 1. The interior nozzle 2 has a cylindrical part 23 and a tapered part 24. The cylindrical part 23 of the interior nozzle 2 is arranged parallel to the axial direction X of the ejector 1. A diameter of the tapered part 24 of the interior nozzle 2 is gradually reduced toward the downstream side. Similarly, the exterior nozzle 3 also has a cylindrical part 33 and a tapered part 34. The cylindrical part 33 of the exterior nozzle 3 is arranged parallel to the axial direction X of the ejector 1. A diameter of the tapered part 34 of the exterior nozzle 3 is gradually reduced toward the downstream side.

A upstream-side end part of the cylindrical part 23 is the inlet part 22 of the interior nozzle 2. A downstream-side end part of the tapered part 24 is the outlet part 21 of the interior nozzle 2. Similarly, a upstream-side end part of the cylindrical part 33 is the inlet part 32 of the exterior nozzle 3. A downstream-side end part of the tapered part 34 is the outlet part 31 of the exterior nozzle 3.

In the structure of the ejector 1 according to the first exemplary embodiment, an angle of the tapered part 24 of the interior nozzle 2 to the axial direction X is smaller than an angle of the tapered part 34 of the exterior nozzle 3 to the axial direction X. For example, the angle of the tapered part 24 of the interior nozzle 2 to the axial direction X is within a range of 5 degrees to 40 degrees (within the range of 5° to 40°). On the other hand, the angle of the tapered part 34 of the exterior nozzle 3 to the axial direction X is within a range of 10 degrees to 45 degrees (within the range of 10° to 45°).

The suction part 11 formed around the outer peripheral part of the exterior nozzle 3 has a cross section of a circular shape, which is perpendicular to the axial direction X of the ejector 1. That is, the suction part 11 is formed between the outer wall of the exterior nozzle 3 and the outer wall 14 of the ejector 1. The outer wall 14 of the ejector 1 has substantially a cylindrical shape, which is composed of an outer peripheral part of the suction part 11, an outer peripheral part of the mixing part 12, and an outer peripheral part of the diffuser part 13. The outer peripheral part of the suction part 11, the outer peripheral part of the mixing part 12, and the outer peripheral part of the diffuser part 13 are formed continuously along the longitudinal direction of the ejector 1. A cross section of the mixing part 12 and a cross section of the diffuser part 13, which are perpendicular to the axial direction X of the ejector 1, have a circular shape, respectively. The diffuser part 13 has an expansion part, a diameter of the expansion part increases gradually toward the downstream side.

It is acceptable to form the inlet part of the suction part 11 at the upstream side in the axial direction of the ejector 1 or to form it at the outer wall 14 in the radial direction of the ejector 1. It is necessary to form the inlet part of the suction part 11 at the upstream side of the outlet part 31 of the exterior nozzle 3. As omitted from the drawings, each of the interior nozzle 2 and the exterior nozzle 3 is fixed independently to the outer wall 14 of the ejector 1, for example, to a part near the inlet part of the ejector 1.

As previously described, the outlet part 21 of the interior nozzle 2 is arranged at the upstream side more than the outlet part 31 of the exterior nozzle 3. As shown in FIG. 3, the distance a in the axial direction X between the outlet part 21 of the interior nozzle 2 and the outlet part 31 of the exterior nozzle 3 is not more than 1.8 times of the diameter d of the outlet part 21 of the interior nozzle 2. It is more preferable for the distance a in the axial direction X between the outlet part 21 of the interior nozzle 2 and the outlet part 31 of the exterior nozzle 3 is not more than the diameter d of the outlet part 21 of the interior nozzle 2.

It is preferable for the distance a in the axial direction X between the outlet part 21 of the interior nozzle 2 and the outlet part 31 of the exterior nozzle 3 to be not less than d/2, where d/2 is a radius of the outlet part 21 of the interior nozzle 2, i.e. to be not less than a half of the diameter d of the outlet part 21 of the interior nozzle 2.

As shown in FIG. 2 and FIG. 3, on a cross section of the ejector 1 along the axial direction X, an angle $\theta$ between a straight line L1 to the axial direction X is greater than a diffusion angle $\eta$ (see FIG. 6) of the diffusion direction S of the driving fluid jet ejected from the interior nozzle 2 to the axial direction X, where the straight line L1 connects the outlet part 21 of the interior nozzle 2 with the outlet part 31 of the exterior nozzle 3.

That is, as shown in FIG. 3, on a cross section of the ejector 1, which includes the central axis XO of both the interior nozzle 2 and the exterior nozzle 3, along the axial direction X of the ejector 1, the straight line L1 connects the outlet part 21 of the interior nozzle 2 with the outlet part 31 of the exterior nozzle 3. The straight line L1 has the angle $\theta$ to the axial direction X, i.e. to the central axis Xo.

Figure 6:
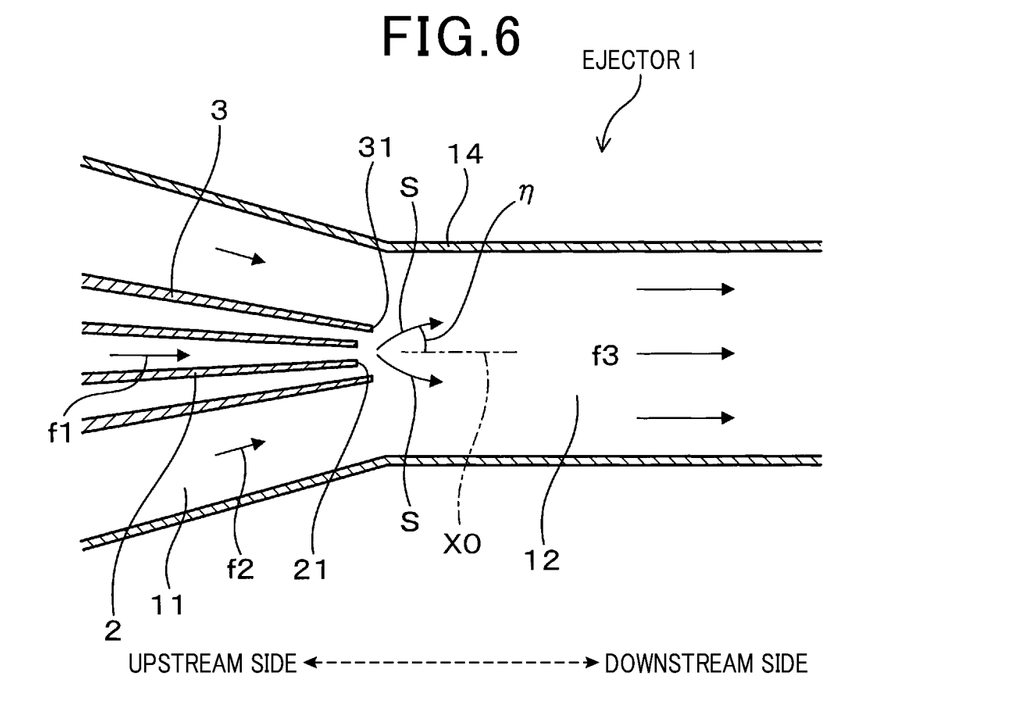
FIG. 6 is a view showing the cross section of the ejector 1 according to the first exemplary embodiment shown in FIG. 1 so as to explain a driving fluid jet generated when the driving fluid is ejected from the outlet part 21 of the interior nozzle 2.

FIG. 6 is a view showing the cross section of the ejector 1 according to the first exemplary embodiment shown in FIG. 1 so as to explain the driving fluid jet generated when the driving fluid is ejected from the outlet part 21 of the interior nozzle 2.

On the other hand, as shown in FIG. 6, on the cross section of the ejector 1, which includes the central axis XO of both the interior nozzle 2 and the exterior nozzle 3, along the axial direction X of the ejector 1, the diffusion direction S of the driving fluid jet ejected from the interior nozzle 2 has the diffusion angle $\eta$ to the central axis XO. In this case, the structure of the ejector 1 according to the first exemplary embodiment satisfies the relationship of $\theta > \eta$.

The diffusion direction S of the driving fluid jet represents an average direction at the outermost periphery of the driving fluid jet, ejected from the outlet part 21 of the interior nozzle 2 to the outlet part 31 of the exterior nozzle 3.

It is possible to calculate the diffusion angle $\eta$ of the driving fluid jet on the basis of an expansion theory of compressible fluid dynamics, i.e. based on a ratio of a pressure of the driving fluid at the outlet part 21, 31 to a pressure of the driving fluid at the inlet part 22, 32 of the nozzle 2, 3. That is, in a case in which the driving fluid is supplied to the interior nozzle 2 only, it is possible to calculate a pressure ratio P21/P22, where P21 indicates a pressure of the driving fluid at the inlet part 22 of the interior nozzle 2, and P22 indicates a pressure of the driving fluid at the outlet part 21 of the interior nozzle 2. On the basis of the expansion theory of compressible fluid dynamics, it is possible to calculate the diffusion angle $\eta$ of the driving fluid jet ejected from the outlet part 21 of the interior nozzle 2.

In the structure of the ejector 1 according to the first exemplary embodiment, a diameter of the outlet part 31 of the exterior nozzle 3 is larger than a diameter of the outlet part 21 of the interior nozzle 2. A fluid channel of the exterior nozzle 3 has a circular shape on a cross section of the exterior nozzle 3, which is perpendicular to the axial direction X, at the outlet part 21 of the interior nozzle 2. That is, the fluid channel of the exterior nozzle 3 is formed between the outer wall of the exterior nozzle 3 and the outer wall of the interior nozzle 2. It is possible for the ejector 1 to have the area of the fluid channel having a circular shape on a cross section of the exterior nozzle 3 which is approximately within a range of 1.2 times to three times of the area of the outlet part 21 on a cross section of the interior nozzle 2.

Figure 5:
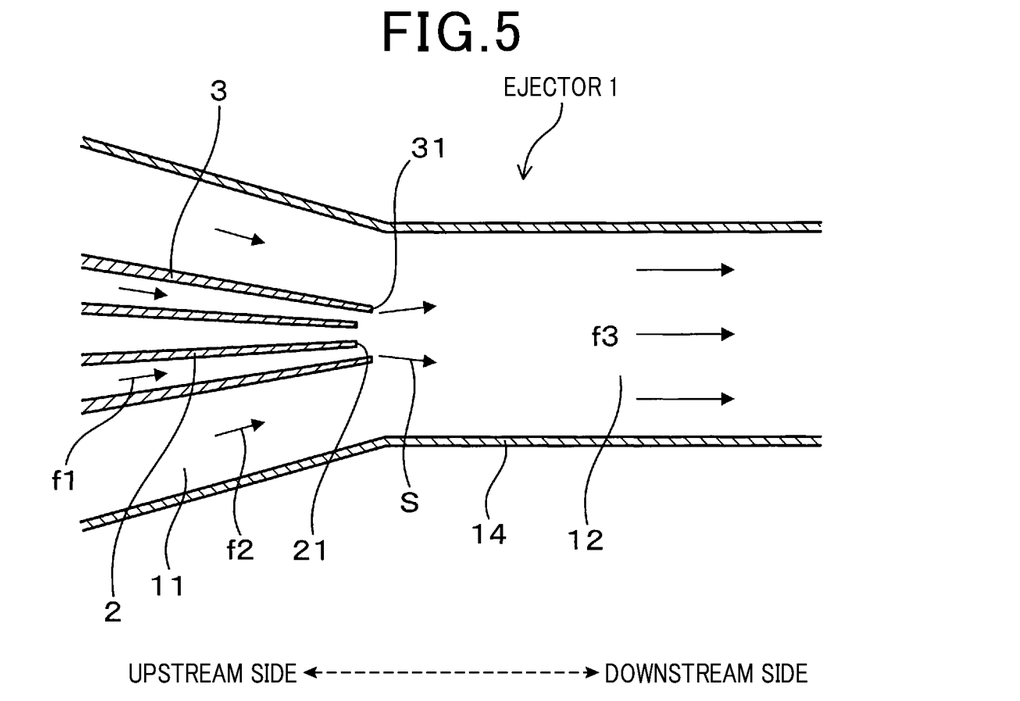
FIG. 5 is a view showing the cross section of the ejector 1 according to the first exemplary embodiment shown in FIG. 1 so as to explain a driving fluid jet generated when the driving fluid is ejected from the outlet part 31 of the exterior nozzle 3.

FIG. 5 is a view showing the cross section of the ejector 1 according to the first exemplary embodiment shown in FIG. 1 so as to explain the driving fluid jet generated when the driving fluid is ejected from the outlet part 31 of the exterior nozzle 3.

In the structure of the ejector 1 according to the first exemplary embodiment, as shown in FIG. 5 and FIG. 6, the driving fluid is supplied into the interior nozzle 2 or the exterior nozzle 3. It is acceptable to supply the driving fluid into the interior nozzle 2 and the exterior nozzle 3 simultaneously. In a usual operation, the driving fluid is supplied into the interior nozzle 2 or the exterior nozzle 3.

As shown in FIG. 5, a large amount of the driving fluid is supplied into the exterior nozzle 3 only. On the other hand, as shown in FIG. 6, a small amount of the driving fluid is supplied to the interior nozzle 2 only. It is possible to use one of the interior nozzle 2 and the exterior nozzle 3 depending on a temperature of fluids such as the driving fluid and the suction fluid which flow in the ejector 1, physical properties of those fluids, and other conditions.

As shown in FIG. 5 and FIG. 6, the arrow f1 indicates the flow direction f1 of the driving fluid. The arrow f2 represents the flow direction f2 of the suction fluid, and the arrow f3 indicates the flow direction f3 of the mixture fluid composed of the driving fluid and the suction fluid.

Figure 8:
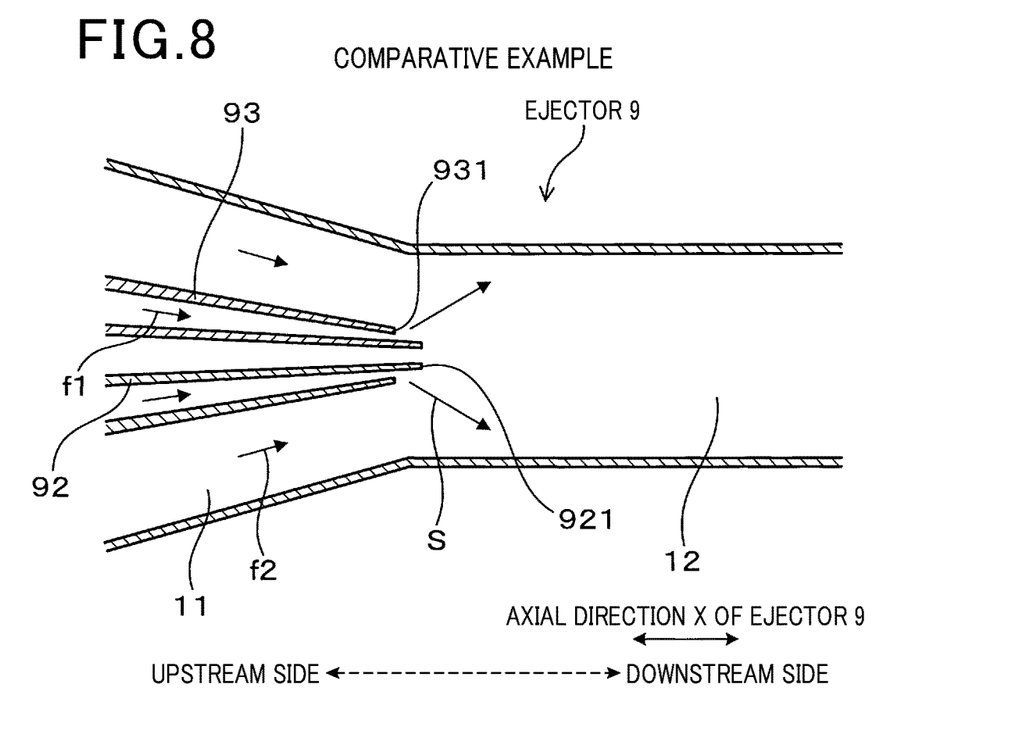
FIG. 8 is a view showing a cross section of the ejector 9 according to the comparative example shown in FIG. 7 so as to explain a driving fluid jet when the exterior nozzle 93 ejects the driving fluid.
Figure 9:
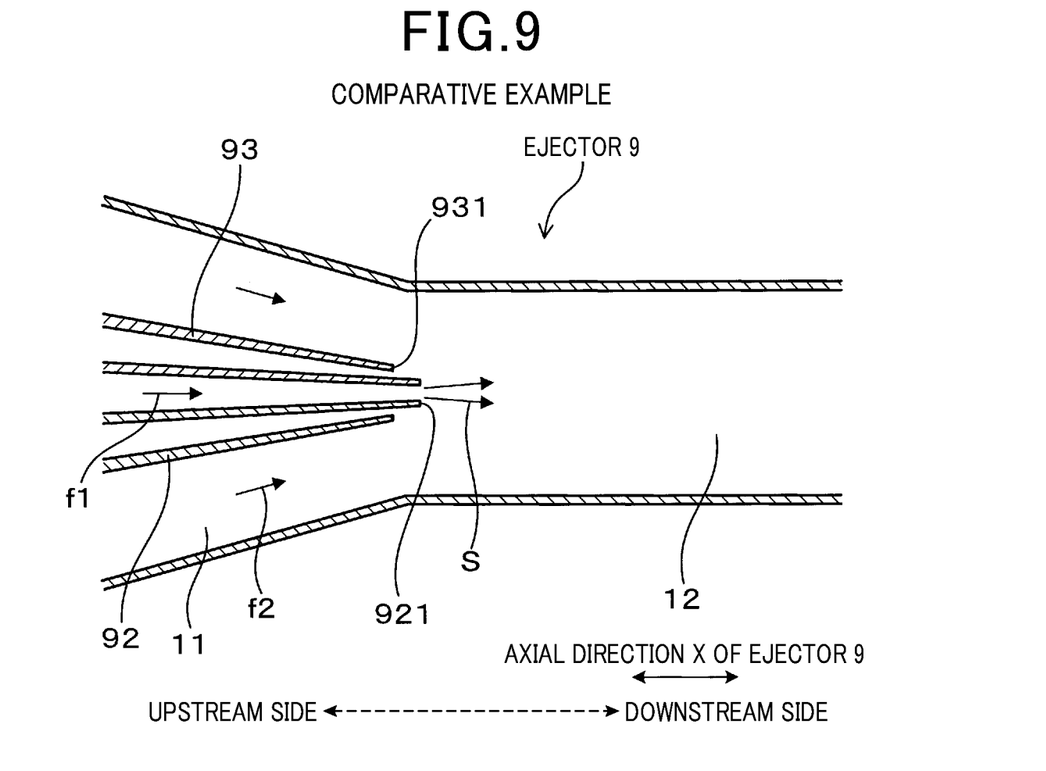
FIG. 9 is a view showing the cross section of the ejector 9 according to the comparative example shown in FIG. 7 so as to explain the driving fluid jet when the interior nozzle 92 ejects the driving fluid.

As previously described, the arrow S indicates the diffusion direction S of the driving fluid jet ejected from the interior nozzle 2 or the exterior nozzle 3. The arrow S, i.e. the diffusion direction S of the driving fluid jet are also shown in FIG. 8 and FIG. 9.

The driving fluid, which has been introduced into the inside of the ejector 1 through the inlet part 22 of the interior nozzle 2 or the inlet part 32 of the exterior nozzle 3, is ejected as the driving fluid jet into the mixing part 12 through the outlet part 21 of the interior nozzle 2 or the outlet part 31 of the exterior nozzle 3. The driving fluid jet is flowing at subsonic speed or at transonic speed which exceeds the speed of sound.

The driving fluid jet sucks the suction fluid flowing in the suction part 11 of the ejector 1. That is, the driving fluid jet reduces a pressure of the suction fluid at the outlet part 21 of the interior nozzle 2 or at the outlet part 31 of the exterior nozzle 3. Accordingly, the suction fluid in the suction part 11 is sucked by the pressure difference at the outlet part 21 of the interior nozzle 2 or the outlet part 31 of the exterior nozzle 3.

The suction fluid and the driving fluid jet are mixed together in the mixing part 12 to generate the mixture fluid. The flow speed of the mixture fluid is reduced in the diffuser part 13 and the pressure of the mixture fluid increases in the diffuser part 13. The mixture fluid is ejected outside through the outlet part of the ejector 1.

A description will be given of the behavior and effects of the ejector 1 having the improved structure previously described according to the first exemplary embodiment.

In the improved structure of the ejector 1 according to the first exemplary embodiment, the outlet part 21 of the interior nozzle 2 is arranged at the upstream side in the axial direction X of the ejector 1 more than the outlet part 31 of the exterior nozzle 3. This improved structure of the ejector makes it possible to avoid negative influence, caused by the flow of the driving fluid jet ejected from the interior nozzle 2 affecting the correct flow of the driving fluid jet ejected from the outlet part 31 of the exterior nozzle 3, i.e. to prevent the driving fluid jet from the interior nozzle 2 affecting the correct flow of the driving fluid jet ejected from the exterior nozzle 3. That is, this improved structure prevents the driving fluid jet ejected from the outlet part 31 of the exterior nozzle 3 from being affected by the driving fluid jet ejected from the outlet part 21 of the interior nozzle 2. As designated by the diffusion direction S of the driving fluid jet shown in FIG. 5, this structure of the ejector 1 makes it possible to suppress the driving fluid jet ejected from the exterior nozzle 3 from being diffused outside. It is accordingly possible to supply the overall driving fluid jet into the axial direction X of the ejector 1 and to increase the suction force of the driving fluid jet so as to suck the suction fluid flowing in the suction part 11. Further, this makes it possible to increase the energy efficiency of the ejector 1 when the driving fluid is ejected from the exterior nozzle 3.

On a cross section along the axial direction X of the ejector 1 according to the first exemplary embodiment, the angle θ between the straight line L1 to the axial direction X is greater than the diffusion angle η of the diffusion direction S of the driving fluid jet ejected from the interior nozzle 2 to the axial direction X. In this case, the straight line L1 connects the outlet part 21 of the interior nozzle 2 with the outlet part 31 of the exterior nozzle 3. This improved structure makes it possible to avoid the driving fluid jet ejected from the interior nozzle 2 from being disturbed by the exterior nozzle 3. In addition to this feature, this structure makes it possible to guide the driving fluid jet at the speed of supersonic ejected from the interior nozzle 2 by the exterior nozzle 3 and to further accelerate the driving fluid jet without disturbance.

Still further, the distance a in the axial direction X between the outlet part 21 of the interior nozzle 2 and the outlet part 31 of the exterior nozzle 3 is not more than 1.8 times of the diameter d of the outlet part 21 of the interior nozzle 2. This improved structure makes it possible to effectively suppress the driving fluid jet ejected from the interior nozzle 2 from being disturbed by the presence of the exterior nozzle 3.

As previously described in detail, the first exemplary embodiment provides the ejector 1 having the improved structure with superior energy efficiency when the exterior nozzle 3 ejects the driving fluid jet.

COMPARATIVE EXAMPLE

A description will be given of an ejector 9 according to a comparative example of the first exemplary embodiment with reference to FIG. 7 to FIG. 9.

Figure 7:
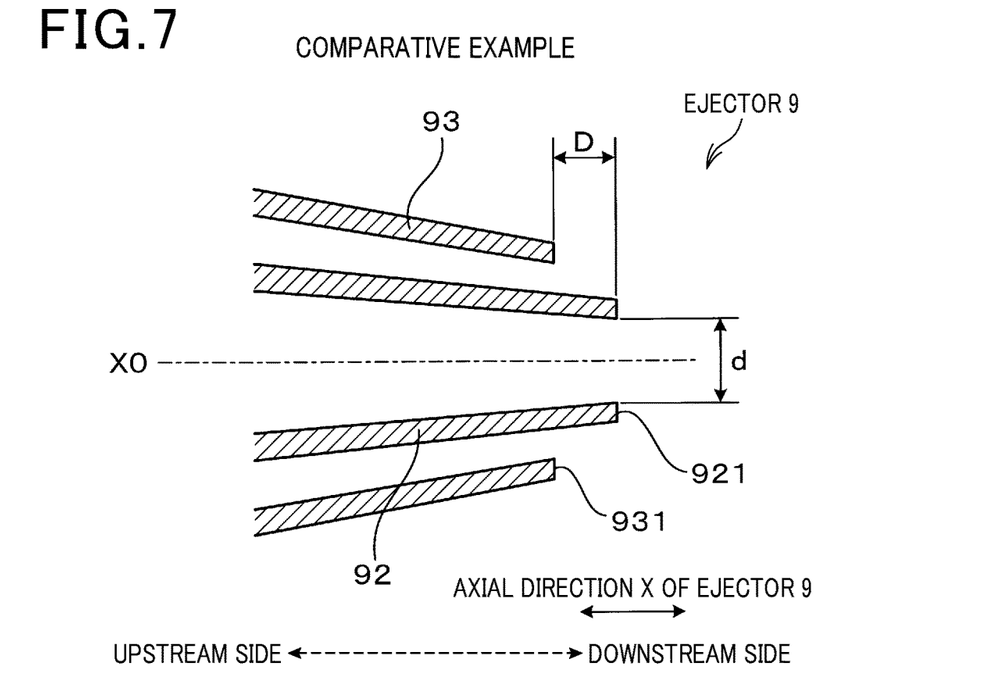
FIG. 7 is a view showing a cross section of an outlet part 921 of an interior nozzle 92 and an outlet part 931 of an exterior nozzle 93 in the ejector 9 according to the comparative example.

FIG. 7 is a view showing a cross section of an outlet part 921 of an interior nozzle 92 and an outlet part 931 of an exterior nozzle 93 in the ejector 9 according to the comparative example. As shown in FIG. 7, the ejector 9 according to the comparative example has a structure in which the outlet part 921 of the interior nozzle 92 is arranged at the downstream side more than the outlet part 931 of the exterior nozzle 93 along the axial direction X of the ejector 9. The axial direction X of the ejector 9 coincides with the axial direction of the interior nozzle 92 and the axial direction of the exterior nozzle 93. That is, the interior nozzle 92 projects toward the downstream side more than the exterior nozzle 93.

Other components of the ejector 9 according to the comparative example are the same as those of the ejector 1 according to the first exemplary embodiment. The explanation of the same components is omitted here for brevity.

FIG. 8 is a view showing a cross section of the ejector 9 according to the comparative example shown in FIG. 7 so as to explain the driving fluid jet when the exterior nozzle 93 ejects the driving fluid. As shown in FIG. 8, when the exterior nozzle 93 ejects the driving fluid as the driving fluid jet through the outlet part 931 thereof, the driving fluid jet significantly diffuses outside because the presence of the outlet part 921 of the interior nozzle 92 disturbs the smooth flow of the driving fluid jet. That is, the diffusion direction S of the driving fluid jet ejected from the exterior nozzle 931 of the exterior nozzle 93 becomes significantly expanded. For this reason, the outlet part 921 of the interior nozzle 92 significantly disturbs the diffusion direction of the driving fluid jet toward the downstream side along the axial direction X of the ejector 9. This reduces the suction force, and the suction fluid is sucked in the suction part 11 in the ejector 9.

FIG. 9 is a view showing the cross section of the ejector 9 according to the comparative example shown in FIG. 7 so as to explain the driving fluid jet when the interior nozzle 92 ejects the driving fluid.

On the other hand, as shown in FIG. 9, when the outlet part 921 of the interior nozzle 92 ejects the driving fluid, because the exterior nozzle 93 does not disturb the driving fluid jet ejected from the outlet part 921 of the interior nozzle 92, it is possible to maintain the suction force generated by the driving fluid jet ejected from the interior nozzle 92.

EXPERIMENTAL RESULTS

A description will be given of experimental results of the ejector function of the ejector 1 according to the first exemplary embodiment and the ejector 9 according to the comparative example with reference to FIG. 10 and FIG. 11.

Figure 10:
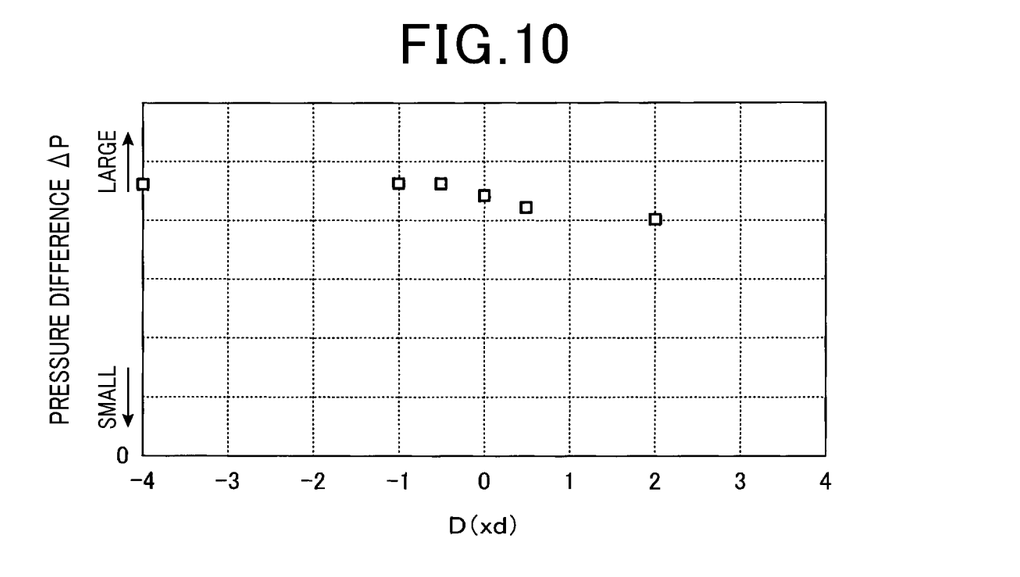
FIG. 10 is a graph showing experimental results as analysis results when the driving fluid is supplied into the exterior nozzle of the ejector.

FIG. 10 is a graph showing experimental results as analysis results when the driving fluid is supplied into the exterior nozzle of the ejector. FIG. 11 is a graph showing experimental results as analysis results when the driving fluid is supplied into the interior nozzle of the ejector.

The flow of the driving fluid as a compressible fluid in each of the ejector 1 and the ejector 9 has been analyzed on the basis of computational fluid dynamics (CFD). The experiment calculated, as the performance of each ejector (hereinafter, the ejector performance), a difference $\Delta P$ of a pressure (hereinafter, referred to as the pressure difference $\Delta P$), i.e. between a boosted pressure at the outlet part of the ejector to a pressure at the inlet part of the suction part 11.

The experiment varied a distance D measured in the axial direction X between the outlet part of the interior nozzle and the outlet part of the exterior nozzle in each ejector as each test sample, and then analyzed the pressure difference in each ejector as the ejector performance. In the experiment, a constant amount of the suction fluid was supplied into the suction part in each ejector. The experiment was performed in the following two cases, in one of which the driving fluid was supplied into the exterior nozzle only, and in the other of which, the driving fluid was supplied into the exterior nozzle only.

FIG. 10 shows the experimental results as analysis results when the driving fluid was supplied into the exterior nozzle of each test sample (ejector). On the other hand, FIG. 11 shows the experimental results as analysis results when the driving fluid was supplied into the interior nozzle of each test sample (ejector).

In FIG. 10, the horizontal axis indicates a ratio D(xd) of the distance D (see FIG. 7) to the diameter d of the outlet part of the interior nozzle of each of the test samples, and the vertical axis indicates the pressure difference $\Delta P$. That is, there is the relationship of D(xd)=D/d (see FIG. 7). In particular, the distance a shown in FIG. 3 and the distance D shown in FIG. 7 satisfy the relationship of D=−a.

Figure 11:
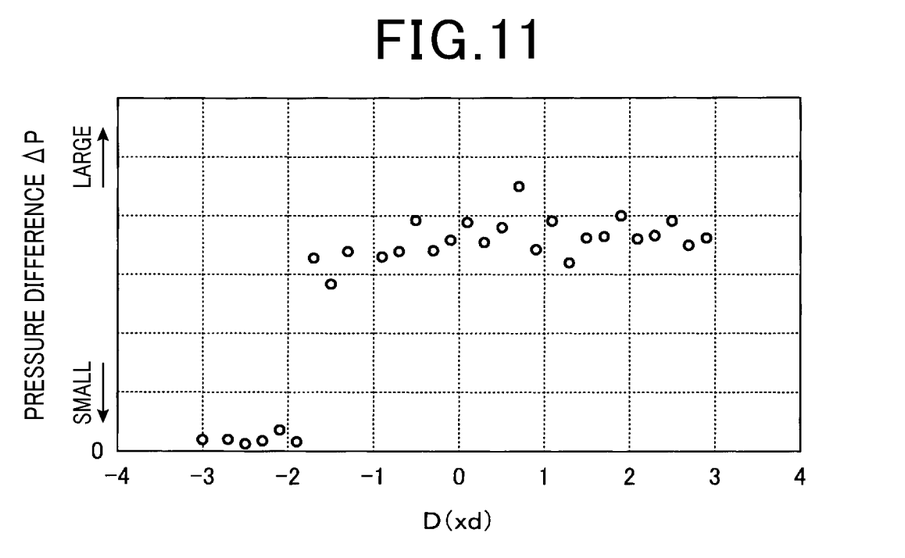
FIG. 11 is a graph showing experimental results as analysis results when the driving fluid is supplied into the interior nozzle of the ejector.

In the graph shown in FIG. 10 and the graph shown in FIG. 11, the horizontal axis indicates a ratio D(xd) of the distance D to the diameter d (see FIG. 3 and FIG. 7), and the vertical axis indicates the pressure difference $\Delta P$. The diameter d indicates the diameter of the outlet part of the interior nozzle of each of the test samples.

In the structure in which the exterior nozzle projects toward the downstream side more than the interior nozzle in the axial direction X of the ejector, the distance D has a negative value.

The ejector according to the first exemplary embodiment has a relationship of D<0, and the ejector according to the comparative example has a relationship of D>0. Further, the distance a in the ejector 1 according to the first exemplary embodiment shown in FIG. 3 and the distance D in the ejector 9 according to the comparative example shown in FIG. 7 satisfy the relationship of a=−D.

The origin of the vertical axis shown in FIG. 10 and FIG. 11 indicates the pressure difference $\Delta P$ of zero ($\Delta P$=0). The higher the point upward on the vertical axis is, the greater the pressure difference $\Delta P$ increases. Still further, the scale of the vertical axis shown in FIG. 10 is larger than the scale of the vertical axis shown in FIG. 11.

As can be understood from the experimental results shown in FIG. 10, when the driving fluid is supplied into the exterior nozzle of each ejector as each test sample, the ejector having the relationship of D<0 has the pressure difference $\Delta P$ which is higher than the pressure difference $\Delta P$ of the ejector having the relationship of D>0. That is, the ejector according to the first exemplary embodiment previously described has the superior ejector performance when compared with that of the comparative example. In particular, as can be understood from the experimental results shown in FIG. 10, it can be understood from the experimental results shown in FIG. 10 that the ejector has the increased pressure difference $\Delta P$ when the following relationship is satisfied: $D(xd) \leq -0.5d$.

Accordingly, it is preferable for the ejector to have the structure which satisfies the distance a between the outlet part 21 of the interior nozzle 2 and the outlet part 31 of the exterior nozzle 3 to be not less than d/2, where d/2 is a radius of the outlet part 21 of the interior nozzle 2, i.e. to be not less than a half of the diameter d of the outlet part 21 of the interior nozzle 2.

On the other hand, when the driving fluid is supplied into the interior nozzle of the ejector, as can be understood from the experimental results shown in FIG. 11, the ejector performance of each test sample does not approximately vary until $D(xd)=-1.8\,d$ even if the relationship of $D(xd)<0$ is satisfied when compared with the ejector which satisfies the relationship of $D(xd)>0$. Accordingly, in a case in which the driving fluid is supplied to the interior nozzle, it is possible to maintain the superior performance of the ejector 1 according to the first exemplary embodiment so long as the outlet part 21 of the interior nozzle 2 is arranged to project toward the downstream side, not significantly deviating from the position of the outlet part 31 of the exterior nozzle 3.

When the relationship of $D(xd) \geq -1.0\,d$ is satisfied, it is possible to provide the ejector 1 having stable performance. Accordingly, it is preferable to satisfy that the distance a between the outlet part 21 of the interior nozzle 2 and the outlet part 31 of the exterior nozzle 3 is not more than the diameter d of the outlet part 21 of the interior nozzle 2.

SECOND EXEMPLARY EMBODIMENT

A description will be given of the ejector 1 according to the second exemplary embodiment with reference to FIG. 12.

Figure 12:
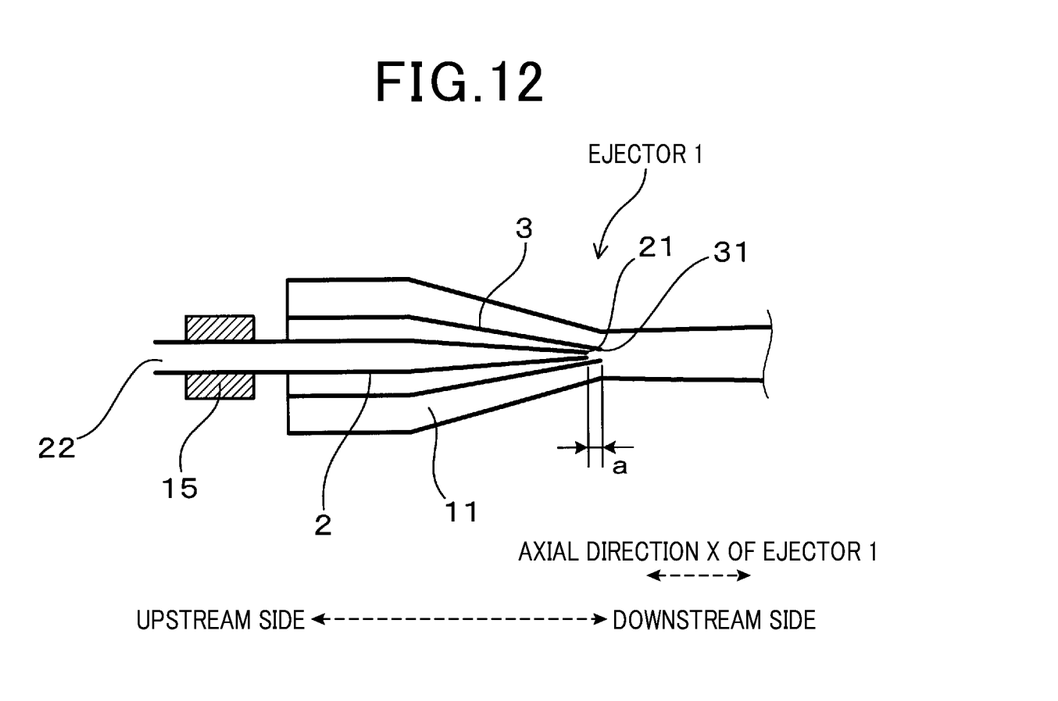
FIG. 12 is a view showing a cross section of a part of the ejector 1 according to a second exemplary embodiment of the present invention.

FIG. 12 is a view showing a cross section of a part of the ejector 1 according to the second exemplary embodiment of the present invention. As shown in FIG. 12, the ejector 1 according to the second exemplary embodiment has a nozzle position adjusting part 15.

The nozzle position adjusting part 15 is configured to move the interior nozzle 2 toward the downstream side along the axial direction X of the ejector 1. For example, the nozzle position adjusting part 15 adjusts the position of the interior nozzle 2 toward the downstream side along the axial direction X of the ejector 1 so as to adjust a relative position between the interior nozzle 2 and the exterior nozzle 3 along the axial direction X of the ejector 1.

A nozzle position adjusting part 15 is composed of an electrical actuator which is arranged at a location near the inlet part 22 of the interior nozzle 2, which is opposite in position to the outlet part 21 of the interior nozzle 2. This structure makes it possible to smoothly move the interior nozzle 2 along the axial direction X of the ejector 1, and to perform a fine adjustment of the position of the interior nozzle 2 to the position of the exterior nozzle 3. The exterior nozzle 3 is fixed in the ejector 1 shown in FIG. 12.

The concept of the present invention is not limited by this structure of the ejector 1 according to the second exemplary embodiment shown in FIG. 12. For example, it is possible to have another modification in which the nozzle position adjusting part 15 moves the exterior nozzle 3 only to the interior nozzle 2, the position of which is fixed.

Other components of the ejector 1 according to the second exemplary embodiment are the same as those of the ejector 1 according to the first exemplary embodiment. The explanation of the same components is omitted here for brevity.

In the structure of the ejector 1 according to the second exemplary embodiment, it is possible for the nozzle position adjusting part 15 to adjust the distance a (see FIG. 12) in the axial direction X between the outlet part 21 of the interior nozzle 2 and the outlet part 31 of the exterior nozzle 3 on the basis of a flow amount of the driving fluid, a pressure of the driving fluid and a temperature of the driving fluid, physical properties of the fluids, and other conditions.

Further, the ejector 1 according to the second exemplary embodiment has the same behavior and effects of the ejector 1 according to the first exemplary embodiment.

THIRD EXEMPLARY EMBODIMENT

A description will be given of a fuel cell system 4 having the ejector 1 according to the present invention with reference to FIG. 13.

Figure 13:
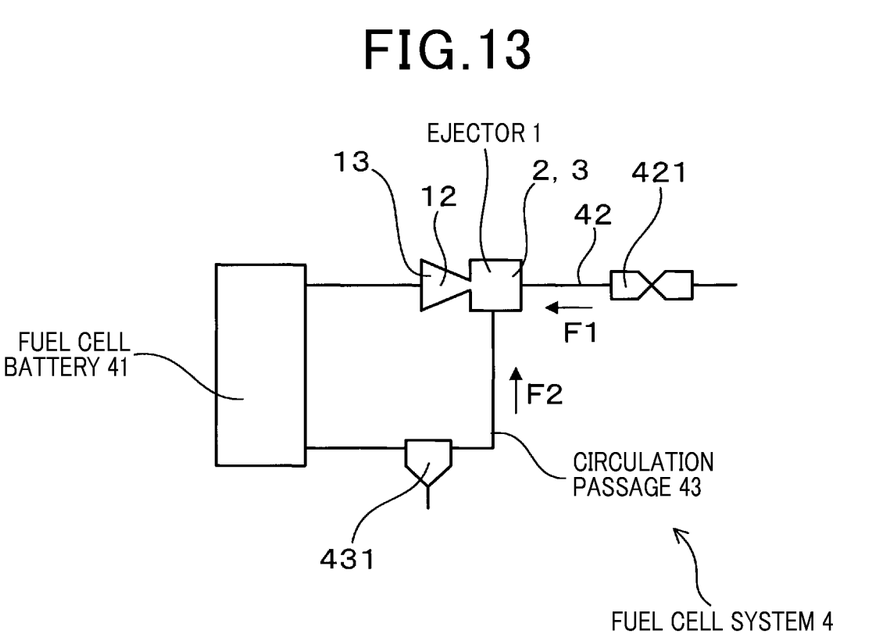
FIG. 13 is a view explaining a fuel cell system 4 having the ejector 1, according to a third exemplary embodiment of the present invention.

FIG. 13 is a view explaining a fuel cell system 4 having the ejector 1 according to the third exemplary embodiment of the present invention. As shown in FIG. 13, the fuel cell system 4 according to the third exemplary embodiment has the ejector 1, a fuel cell battery 41 and a fuel gas supply passage 42. The fuel gas supply passage 42 supplies a fuel gas F1 to the fuel cell battery 41. The ejector 1 is mounted on the fuel gas supply passage 42. This ejector 1 has the improved structure which has been explained in detail in the first exemplary embodiment and the second exemplary embodiment.

The fuel cell system 4 according to the third exemplary embodiment further has a circulation passage 43 through which a circulation gas F2, which is a part of the exhaust fuel gas exhausted from the fuel cell battery 41, is circulated into the fuel gas supply passage 42. A condenser 431 is mounted on the circulation passage 43 so as to remove water component from the circulation gas F2 which is flowing in the circulation passage 43. After this, the circulation gas F2 is returned to the fuel gas supply passage 42.

That is, the circulation passage 43 is connected to the suction part 11 in the ejector 1 mounted on the fuel gas supply passage 42. A gas flow adjusting part 421 is mounted at the upstream side of the ejector 1 in the fuel gas supply passage 42. The gas flow adjusting part 421 is configured to adjust the flow amount of the fuel gas F1.

In the fuel gas supply passage 42, the fuel gas, the flow amount of which has been adjusted by the gas flow adjusting part 421, is introduced as the driving fluid into the ejector 1. That is, the fuel gas F1 is supplied as the driving fluid into the interior nozzle 2 and/or the exterior nozzle 3. For example, the fuel gas F1 is introduced into the interior nozzle 2 or the exterior nozzle 3 on the basis of the flow amount of the furl gas F1. The circulation gas F2 is sucked as the suction fluid from the circulation passage 43 into the inside of the ejector 1 through the suction part 11. The fuel gas F1 and the suction gas F2 are mixed together as a gas mixture in the mixing part 12. The diffuser part 13 boosts the pressure of the gas mixture, and the ejector 1 ejects the boosted gas mixture to the outside of the ejector 1. This gas mixture composed of the fuel gas F1 and the circulation gas F2 is introduced into the fuel cell battery 41.

In the fuel cell system 4 according to the third exemplary embodiment, the ejector 1 is mounted on the fuel gas supply passage 42. This structure makes it possible to circulate the circulation gas F2 with high efficiency, and to supply the gas mixture composed of the fuel gas F1 and the circulation gas F2 is supplied into the fuel cell battery 41 with high efficiency. As a result, this makes it possible to provide the fuel cell system 4 with high performance. In particular, it is possible for the fuel cell system 4 to have high energy efficiency when the fuel gas F1 is supplied onto the exterior nozzle 3 in the ejector 1. This makes it possible to increase the energy efficiency when a large amount of the fuel gas F1 is supplied into the fuel cell battery 41.

FOURTH EXEMPLARY EMBODIMENT

A description will be given of a refrigeration cycle system 5 having the ejector 1 according to the present invention with reference to FIG. 14.

Figure 14:
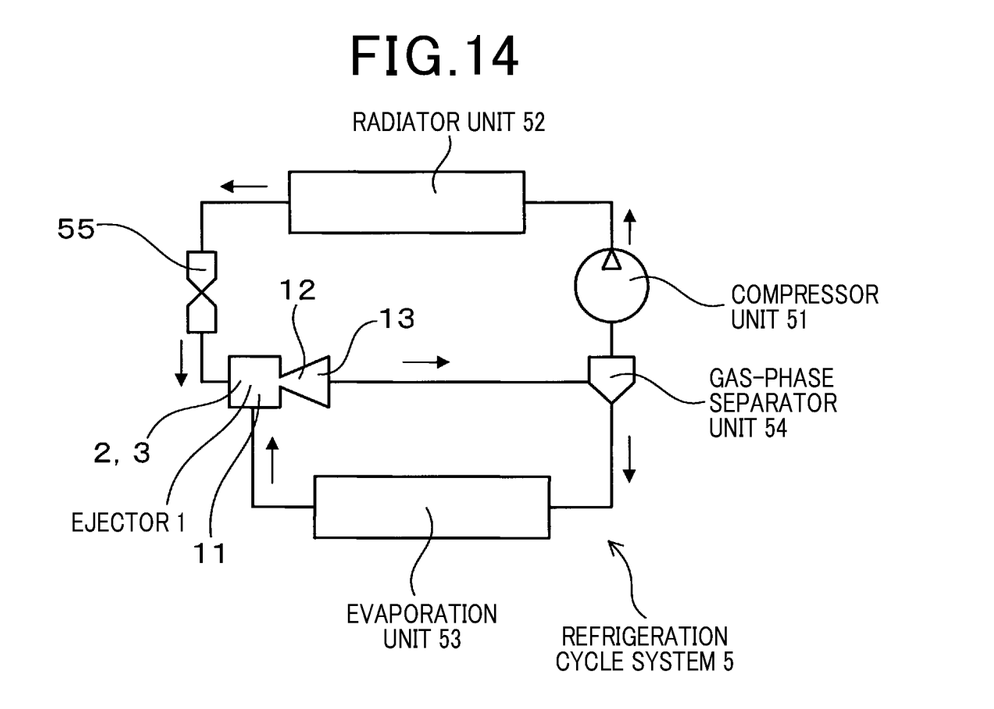
FIG. 14 is a view explaining a refrigeration cycle system 5 having the ejector 1, according to a fourth exemplary embodiment of the present invention.

FIG. 14 is a view explaining the refrigeration cycle system 5 having the nozzle 1 according to the fourth exemplary embodiment of the present invention. As shown in FIG. 14, the refrigeration cycle system 5 according to the fourth exemplary embodiment has a compressor unit 51, a radiator unit 52, an evaporation unit 53, a gas-phase separator unit 54 and the ejector 1. This ejector 1 has the improved structure which has been explained in detail in the first exemplary embodiment and the second exemplary embodiment.

The compressor unit 51 receives a coolant and compresses it to rise a pressure of the coolant. The radiator unit 52 cools the coolant supplied from the compressor unit 51. The evaporation unit 53 evaporates the coolant to perform the endothermic process. The gas-phase separator unit 54 separates the coolant ejected from the ejector 1 into a vapor-phase coolant and a liquid-phase coolant. The vapor-phase coolant is supplied into the compressor unit 51. On the other hand, the liquid-phase coolant is supplied into the evaporation unit 53.

The ejector 1 receives the coolant as the driving fluid supplied from the radiator unit 52, and sucks the vapor-phase coolant as the suction fluid, which has been evaporated in and supplied from the evaporation unit 53. The ejector 1 mixes the driving fluid and the suction fluid together, and ejects the mixture fluid composed of the driving fluid and the suction fluid. The mixture fluid is supplied to the gas-phase separator unit 54.

A flow amount adjusting unit 55 is mounted between the radiator unit 52 and the ejector 1 so as to adjust the flow amount of the coolant as the driving fluid to be supplied to the interior nozzle 2 and/or the exterior nozzle 3 in the ejector 1. The radiator unit 52 supplies the coolant as the driving fluid into the interior nozzle or the exterior nozzle 3, for example. Further, the vapor-phase coolant evaporated in the evaporation unit 53 is supplied as the suction fluid into the suction part 11 of the ejector 1. The mixing part 12 in the ejector 1 mixes the coolant as the driving fluid and the coolant as the suction fluid to generate the mixture fluid. The diffuser part 13 in the ejector 1 reduces the flow speed of the coolant as the mixture fluid, and compresses the coolant. The diffuser part 13 compresses the coolant and ejects the compressed coolant. The compressed coolant is supplied to the gas-phase separator unit 54.

The gas-phase separator unit 54 supplies the liquid-phase coolant into the evaporation unit 53. The liquid-phase coolant is vapored in the evaporation unit 53 to perform the refrigeration cycle in the refrigeration cycle system 5 according to the fourth exemplary embodiment. The gas-phase separator unit 54 supplies the vapor-phase coolant of a high pressure to the compressor unit 51. The compressor unit 51 compresses the vapor-phase coolant and boosts it at a supercritical pressure. The refrigeration cycle system 5 according to the fourth exemplary embodiment uses carbon dioxide gas as the coolant, for example.

The fourth exemplary embodiment provides the refrigeration cycle system 5 using the ejector 1 according to the first exemplary embodiment. This makes it possible to increase the pressure of the coolant to be supplied to the gas-phase separator unit 54 with high efficiency. As a result, it is possible to provide the refrigeration cycle system 5 with high efficiency. In particular, it is possible to increase the energy efficiency of the refrigeration cycle system 5 when the coolant is supplied into the exterior nozzle 3 in the ejector 1. In other words, it is possible for the refrigeration cycle system 5 to increase the energy efficiency when a large amount of the coolant is supplied into the refrigeration cycle system 5.

While specific embodiments of the present invention have been described in detail, it will be appreciated by those skilled in the art that various modifications and alternatives to those details could be developed in light of the overall teachings of the disclosure. Accordingly, the particular arrangements disclosed are meant to be illustrative only and not limited to the scope of the present invention which is to be given the full breadth of the following claims and all equivalents thereof.

What is claimed is:

1. An ejector comprising:
an interior nozzle configured to receive a driving fluid and to eject a driving fluid jet;
an exterior nozzle arranged coaxially with the interior nozzle, configured to receive the driving fluid and to eject the driving fluid jet;
a suction part arranged at an outer periphery of the exterior nozzle, configured to suck a suction fluid by the driving fluid jet ejected from at least one of the interior nozzle and the exterior nozzle;
a mixing part configured to mix the driving fluid jet ejected from at least one of the interior nozzle and the exterior nozzle with the suction fluid sucked by the suction part, and to supply a mixture fluid; and
a diffuser part configured to reduce a flow speed of the mixture fluid composed of the driving fluid jet and the suction fluid, and to eject the mixture fluid, wherein
an outlet part of the interior nozzle is arranged at an upstream side of the ejector more than an outlet part of the exterior nozzle along an axial direction of the ejector.

2. The ejector according to claim 1, wherein on a cross section of the ejector along the axial direction of the ejector, an angle between a straight line to the axial direction of the ejector is greater than a diffusion angle of a diffusion direction of the driving fluid jet ejected from the interior nozzle to the axial direction of the ejector, where the straight line connects the outlet part of the interior nozzle with the outlet part of the exterior nozzle.

3. The ejector according to claim 2, wherein a distance in the axial direction of the ejector between the outlet part of the interior nozzle and the outlet part of the exterior nozzle is not more than 1.8 times of a diameter of the outlet part of the interior nozzle.

4. The ejector according to claim 3, wherein the distance in the axial direction of the ejector between the outlet part of the interior nozzle and the outlet part of the exterior nozzle is not more than the diameter of the outlet part of the interior nozzle.

5. The ejector according to claim 2, wherein a distance in the axial direction of the ejector between the outlet part of the interior nozzle and the outlet part of the exterior nozzle to be not less than a radius of the outlet part of the interior nozzle.

6. The ejector according to claim 2, further comprising a nozzle position adjusting part configured to adjust a distance in the axial direction of the ejector between the outlet part of the interior nozzle and the outlet part of the exterior nozzle.

7. The ejector according to claim 1, wherein a distance in the axial direction of the ejector between the outlet part of the interior nozzle and the outlet part of the exterior nozzle is not more than 1.8 times of a diameter of the outlet part of the interior nozzle.

8. The ejector according to claim 7, wherein the distance in the axial direction of the ejector between the outlet part of the interior nozzle and the outlet part of the exterior nozzle is not more than the diameter of the outlet part of the interior nozzle.

9. The ejector according to claim 1, wherein a distance in the axial direction of the ejector between the outlet part of the interior nozzle and the outlet part of the exterior nozzle is not less than a radius of the outlet part of the interior nozzle.

10. The ejector according to claim 1, further comprising a nozzle position adjusting part configured to adjust a distance in the axial direction of the ejector between the outlet part of the interior nozzle and the outlet part of the exterior nozzle.

11. A fuel cell system comprising:
a fuel cell battery;
a fuel gas supply passage configured to supply a fuel gas to the fuel cell battery; and
an ejector of claim 1 mounted on the fuel gas supply passage.

12. A refrigeration cycle system comprising:
a compressor unit configured to receive a coolant, to compress the received coolant, to increase a pressure of the coolant, and to eject the coolant at an increased pressure;
a radiator unit configured to cool the coolant ejected from the compressor unit;
an evaporation unit configured to evaporate the coolant to perform an endothermic process;
an ejector of claim 1 configured to receive the coolant supplied from the radiator unit as the driving fluid, and to receive the vapor-phase coolant as the suction fluid, evaporated by the evaporation unit, and to mix the driving fluid and the suction fluid to generate the mixture fluid, and to eject the mixture fluid, and a gas-phase separator unit configured to receive the mixture fluid as the coolant ejected from the ejector, and to separate the received coolant into a vapor-phase coolant and a liquid-phase coolant, to supply the vapor-phase coolant to the compressor unit, and to supply the liquid-phase coolant to the evaporation unit.

\* \* \* \* \*